(12) United States Patent
Takeda

(10) Patent No.: US 11,401,091 B2
(45) Date of Patent: Aug. 2, 2022

(54) COATED ALUMINUM SHEET AND ALUMINUM CAN LID

(71) Applicant: UACJ Corporation, Tokyo (JP)

(72) Inventor: Ichio Takeda, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 265 days.

(21) Appl. No.: 16/606,078

(22) PCT Filed: Apr. 19, 2018

(86) PCT No.: PCT/JP2018/016223
§ 371 (c)(1),
(2) Date: Oct. 17, 2019

(87) PCT Pub. No.: WO2018/194148
PCT Pub. Date: Oct. 25, 2018

(65) Prior Publication Data
US 2021/0130056 A1    May 6, 2021

(30) Foreign Application Priority Data

Apr. 19, 2017 (JP) .............................. JP2017-082920

(51) Int. Cl.
*B65D 65/42* (2006.01)
*C09D 7/65* (2018.01)
(Continued)

(52) U.S. Cl.
CPC .............. *B65D 65/42* (2013.01); *B32B 15/08* (2013.01); *B65D 17/08* (2013.01); *B65D 25/14* (2013.01);
(Continued)

(58) Field of Classification Search
CPC . C08L 91/06; C08L 63/00–10; C09D 191/06; C09D 7/65; C09D 163/00–10; B65D 25/14; B65D 65/42; B32B 15/08
See application file for complete search history.

(56) References Cited

FOREIGN PATENT DOCUMENTS

JP         2002283496 A       10/2002
JP         2007216180 A       8/2007
(Continued)

OTHER PUBLICATIONS

Partial machine translation of JP 2007-245536 A (2007).*
(Continued)

*Primary Examiner* — Kregg T Brooks
(74) *Attorney, Agent, or Firm* — David D. Brush; Westman, Champlin & Koehler, P.A.

(57) ABSTRACT

A coated aluminum sheet includes an aluminum alloy sheet including a first surface and a second surface situated opposite to the first surface and first and second coating films formed on the first and second surfaces, respectively. The first and second coating films each have a mass of 0.1 to 20 g/m$^2$ per unit area. The first coating film includes 0.1 to 1.5% by mass of a polyethylene wax and 0.1 to 1.5% by mass of a carnauba wax. The second coating film includes 0.4 to 0.8% by mass of a polyethylene wax and 0.4 to 0.8% by mass of a carnauba wax. Respective contents of another wax in the first and second coating films are 1.5% by mass or less and 0.7% by mass or less respectively. Post-lubrication including a petrolatum wax on the second coating film is 10 mg/m$^2$ or less in amount.

9 Claims, 2 Drawing Sheets

(51) Int. Cl.
*C09D 163/00* (2006.01)
*C09D 191/06* (2006.01)
*B65D 25/14* (2006.01)
*B32B 15/08* (2006.01)
*B65D 17/00* (2006.01)

(52) U.S. Cl.
CPC ............. *C09D 7/65* (2018.01); *C09D 163/00* (2013.01); *C09D 191/06* (2013.01)

(56) References Cited

FOREIGN PATENT DOCUMENTS

| | | | |
|---|---|---|---|
| JP | 2007245536 | A | 9/2007 |
| JP | 4695518 | B2 | 6/2011 |
| JP | 2001153247 | A | 8/2011 |
| JP | 2011153247 | | 8/2011 |
| JP | 2012184330 | A | 9/2012 |

OTHER PUBLICATIONS

English machine translation of Notice of Reasons for Refusal dated May 11, 2021 in the corresponding Japanese Application No. 2017-082920.
International Search Report dated Jul. 3, 2018 for corresponding International Application No. PCT/JP2018/016223, filed Apr. 19, 2018.
English machine translation of Notice of Reasons for Refusal dated Jan. 5, 2021 in the corresponding Japanese Application No. 2017-082920.
International Preliminary Report on Patentability and English translation of the Written Opinion dated Jul. 10, 2018, for corresponding International Application No. PCT/JP2018/016223, filed Apr. 19, 2018.
Office Action issued in the corresponding Vietnamese patent application No. 1-2019-06064, dated Jan. 27, 2022 and its English translation.
Substantive Examination Adverse Report dated Apr. 21, 2022 in the corresponding Malaysian Patent Application No. PI2019006086.

* cited by examiner

COATED ALUMINUM SHEET AND ALUMINUM CAN LID

CROSS-REFERENCE TO RELATED APPLICATION

This Application is a Section 371 National Stage Application of International Application No. PCT/JP2018/016223, filed Apr. 19, 2018, published as WO 2018/194148 on Oct. 25, 2018, not in English, which claims the benefit of Japanese Patent Application No. 2017-82920 filed on Apr. 19, 2017 with the Japan Patent Office, the entire disclosures of International Application No. PCT/JP2018/016223 and Japanese Patent Application No. 2017-82920 are incorporated herein by reference.

TECHNICAL FIELD

The present disclosure relates to a coated aluminum sheet and an aluminum can lid.

BACKGROUND ART

A coated aluminum sheet is used for a can that contains beer, low-malt beer, carbonated drink, and the like. Required performance for such a can is excellent foaming performance and foam disappearance resistance. The excellent foaming performance means excellent performance in respect of foam formation in pouring beer, low-malt beer, carbonated drink or the like, which is contained in a can, into another container, such as a cup or the like. Further, the foam disappearance resistance means performance in which foam occurred in another container can hardly disappear. Hereinafter, the excellent foaming performance and the foam disappearance resistance are together appropriately referred to as foaming performance.

Patent Document 1 discloses a method of improving the foaming performance. Patent Document 1 discloses to contain a carnauba wax in a coating film that is included in a coated aluminum sheet.

PRIOR ART DOCUMENTS

Patent Documents

Patent Document 1: Japanese Patent No. 4695518

SUMMARY OF THE INVENTION

Problems to be Solved by the Invention

A coated aluminum sheet is sought to have molding workability. The technique disclosed in Patent Document 1 provides insufficient molding workability of the coated aluminum sheet.

In one aspect of the present disclosure, it is desirable to provide a coated aluminum sheet and an aluminum can lid that are excellent in foaming performance and molding workability.

Means for Solving the Problems

One aspect of the present disclosure is a coated aluminum sheet that comprises an aluminum alloy sheet that includes a first surface and a second surface that is situated opposite to the first surface, a first coating film that is formed on the first surface of the aluminum alloy sheet, and a second coating film that is formed on the second surface of the aluminum alloy sheet. The first coating film and the second coating film each have a mass of 0.1 to 20 g/m$^2$ per unit area. The first coating film includes 0.1 to 1.5% by mass of a polyethylene wax and 0.1 to 1.5% by mass of a carnauba wax. A content of wax other than the polyethylene wax and the carnauba wax in the first coating film is 1.5% by mass or less. The second coating film includes 0.4 to 0.8% by mass of a polyethylene wax and 0.4 to 0.8% by mass of a carnauba wax. A content of wax other than the polyethylene wax and the carnauba wax in the second coating film is 0.7% by mass or less. Post-lubrication, which includes a petrolatum wax, on the second coating film is 10 mg/m$^2$ or less in amount.

Another aspect of the present disclosure is an aluminum can lid that includes the coated aluminum sheet according to the one aspect of the present disclosure, in which the first coating film is situated in an outer surface of the aluminum can lid and the second coating film is situated in an inner surface of the aluminum can lid.

EXPLANATION OF REFERENCE NUMERALS

Figure 1:
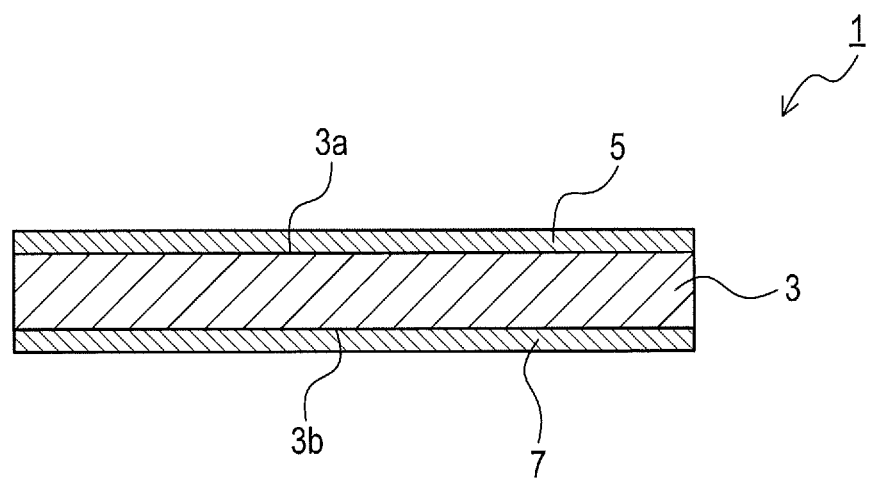
FIG. 1 is a side sectional view showing a configuration of a coated aluminum sheet.

1 . . . coated aluminum sheet, 3 . . . aluminum alloy sheet, 3a . . . first surface, 3b . . . second surface, 5 . . . first coating film, 7 . . . second coating film

Mode for Carrying Out the Invention

An embodiment of the present disclosure will be described.

1. Coated Aluminum Sheet (1) Aluminum Alloy Sheet

An aluminum alloy sheet is not particularly limited in its material. However, the material is, for example, an Al—Mg-based alloy, an Al—Cu-based alloy, an Al—Mg-based alloy, an Al—Si-based alloy, an Al—Mg—Si-based alloy, an Al—Zn—Mg-based alloy, an A5182 alloy sheet (Al—Mg based alloy), and the like.

The aluminum alloy sheet includes a first surface and a second surface that is situated opposite to the first surface.

Preferably, one of the first surface or the second surface of the aluminum alloy sheet includes or both the first surface and the second surface of the aluminum alloy sheet include a chemical conversion film(s). For example, the chemical conversion film is an undercoat of a first coating film and/or a second coating film. The chemical conversion film can be formed by, for example, an undercoat treatment. When the aluminum alloy sheet includes the chemical conversion film, the first coating film and/or the second coating film has enhanced adherence to the aluminum alloy sheet. Further, when the aluminum alloy sheet includes the chemical conversion film, the coated aluminum sheet has enhanced corrosion resistance. A treatment of forming the chemical conversion film is, for example, a phosphate chromate treatment, a Zr-based chemical treatment, a Ti-based chemical treatment and the like.

(2) First Coating Film

The first coating film is formed on one side (the first surface) of the aluminum alloy sheet. The first coating film is 0.1 to 20 g/m² in mass per unit area. The first coating film includes 0.1 to 1.5% by mass of a polyethylene wax and 0.1 to 1.5% by mass of a carnauba wax. Preferably, the first coating film includes 0.4 to 1.5% by mass of the polyethylene wax and 0.4 to 1.5% by mass of the carnauba wax.

Here, the mass of the first coating film per unit area means a mass of a coating film in solid content of a coating material per unit area of the coating film in the present specification.

The coated aluminum sheet includes the above-described first coating film and is therefore excellent in the foaming performance and molding workability. In addition, the first coating film includes the carnauba wax and has therefore enhanced lubrication performance and scratch resistance. The carnauba wax is a solid wax that has a melting point of approximately 80° C. Further, the first coating film includes the polyethylene wax and has therefore enhanced scratch resistance. The polyethylene wax is a relatively solid wax that has a melting point of approximately 110 to 120° C.

When the first coating film is 0.1 g/m² or more in mass per unit area, it is easy to evenly form the first coating film, which further enhances the corrosion resistance of the coated aluminum sheet. When the first coating film is 20 g/m² or less in mass per unit area, it is possible to reduce a cost for manufacturing the coated aluminum sheet.

Preferably, a deposited amount of the carnauba wax deposited on a surface of the first coating film is 2.5 to 10 mg/m². When the deposited amount of the carnauba wax is 2.5 mg/m² or more, molding performance is further enhanced in performing can lid-molding for the coated aluminum sheet. When the deposited amount of the carnauba wax is 10 mg/m² or less, the foaming performance is further enhanced. Here, a method of measuring the deposited amount of the carnauba wax is described below.

The polyethylene wax and the carnauba wax each are an inner wax. The inner wax is added in advance into, for example, a coating material that forms the first coating film. The inner wax is, for example, precipitated on the surface of the first coating film or is present within the first coating film after coating and baking.

The first coating film may include, as the inner wax, wax other than the carnauba wax and the polyethylene wax. The wax other than the carnauba wax and the polyethylene wax is, for example, lanolin, microcrystalline, a petrolatum-based ester wax, a petrolatum wax, a synthetic wax, a plant wax, an animal wax, and the like. Lanoline has a melting point of approximately 40° C., which is relatively low, and has a function to enhance smoothness of the coated aluminum sheet. Selection of the inner wax to be blended into the first coating film can provide the first coating film with an essential function.

A content of the wax other than the polyethylene wax and the carnauba wax in the first coating film (in solid content of the coating material) is 1.5% by mass or less. The first coating film having 1.5% by mass content of this wax contributes to excellence in respect of the forming performance.

The coating material that is usable to form the first coating film is, for example, a solvent-based coating material and an aqueous coating material. The solvent-based coating material is, for example, epoxy phenol-based resin, epoxy urea-based resin, vinyl chloride organosol-based resin, thermosetting vinyl-based resin, polyester-based resin, and the like. The aqueous coating material is, for example, epoxy acrylic-based resin and the like. Either the solvent-based coating material or the aqueous coating material is blended with the inner wax. The coating material, in which the inner wax is blended, is then coated onto the coated aluminum sheet and undergoes baking, to thereby form the first coating film.

Preferably, the first coating film is formed with the inner wax and an organic resin coating material. The inner wax contained in the first coating film includes the polyethylene wax and the carnauba wax and may further optionally include the wax other than the polyethylene wax and the carnauba wax.

Preferably, the inner wax is 0.4 to 1.5 parts by mass in mass when the organic resin coating material in the first coating film is 100 parts by mass in solid content. The organic resin coating material is a coating material that contains organic resin, such as the above-described solvent-based coating material and the aqueous coating material. When the inner wax in the first coating film is 0.4 parts by mass or more in mass, it is possible to ensure an amount of the inner wax that is ultimately transferred to the surface of the first coating film. When the inner wax in the first coating film is 1.5 parts by mass or less in total mass, it is possible to inhibit the inner wax, which is ultimately transferred to the surface of the first coating film, from being excessive in amount.

(2) Second Coating Film

The second coating film is formed on the opposing side (a second surface) of the one side of the aluminum alloy sheet. The second coating film is 0.1 to 20 g/m² in mass per unit area. The second coating film includes 0.4 to 0.8% by mass of the polyethylene wax and 0.4 to 0.8% by mass of the carnauba wax.

The coated aluminum sheet is excellent in the foaming performance and the molding workability by including the above-described second coating film. Further, the second coating film has enhanced lubrication performance and scratch resistance by including the carnauba wax therein. The second coating film has the enhanced scratch resistance by including the polyethylene wax therein.

When the second coating film is 0.1 g/m² or more in mass per unit area, it becomes easy to evenly form the second coating film, thereby further enhancing the corrosion resistance of the coated aluminum sheet. When the second coating film is 20 g/m² or less in mass per unit area, it is possible to reduce the cost for manufacturing the coated aluminum sheet.

Here, the mass of the second coating film per unit area means a mass of a coating film in solid content of the coating material per unit area in the present specification.

Preferably, a deposited amount of the carnauba wax on the second coating film is 2.5 to 5 mg/m². When the carnauba wax is 2.5 mg/m² or more in deposited amount, molding performance is further enhanced in performing the can lid-molding for the coated aluminum sheet. When the carnauba wax is 5 mg/m² or less in deposited amount, the foaming performance and the foam disappearance resistance are further enhanced.

The polyethylene wax and the carnauba wax each are the inner wax. The inner wax is added in advance into, for example, a coating material that forms the second coating film. The inner wax is, for example, precipitated on a surface of the second coating film or is present within the second coating film after the coating and the baking.

The second coating film may include, as the inner wax, wax other than the carnauba wax and the polyethylene wax. The wax other than the carnauba wax and the polyethylene wax is, for example, lanolin, microcrystalline, a petrolatum-based ester wax, a petrolatum wax, a synthetic wax, a plant wax, an animal wax, and the like. Lanolin has a function to enhance the lubrication performance of the second coating film. Selection of the inner wax to be blended into the second coating film can provide the second coating film with an essential function.

The second coating film includes 0.7% by mass or less (in solid content of the coating material) of the wax other than the polyethylene wax and the carnauba wax. The second coating film, which includes 0.7% by mass or less content of the wax, contributes to excellence in the foaming performance.

The coating material that is usable to form the second coating film is, for example, the solvent-based coating material and the aqueous coating material. The solvent-based coating material is, for example, epoxy phenol-based resin, epoxy urea-based resin, vinyl chloride organosol-based resin, thermosetting vinyl-based resin, polyester-based resin, and the like. The aqueous coating material is, for example, epoxy acrylic-based resin, and the like. Either the solvent-based coating material or the aqueous coating material is blended with the inner wax. The coating material, in which the inner wax is blended, is then coated on the coated aluminum sheet and undergoes the baking, to thereby form the second coating film.

Preferably, the second coating film is formed with the inner wax and the organic resin coating material. The inner wax contained in the second coating film includes the polyethylene wax and the carnauba wax and may further optionally include the wax other than the polyethylene wax and the carnauba wax.

Preferably, the inner wax is 0.4 to 0.8 parts by mass in mass when the organic resin coating material in the second coating film is 100 parts by mass in solid content. The organic resin coating material is a coating material that contains organic resin, such as the above-described solvent-based coating material and the aqueous coating material. When the inner wax in the second coating film is 0.4 parts by mass or more in mass, it is possible to ensure an amount of the inner wax that is ultimately transferred to the surface of the second coating film. When the inner wax in the second coating film is 0.8 parts by mass or less in total mass, it is possible to inhibit the inner wax, which is ultimately transferred to the surface of the second coating film, from being excessive in amount.

(3) Post-Lubrication

The coated aluminum sheet may include post-lubrication. The post-lubrication is, for example, wax that is applied on a surface of a coating film after coating undergoes the baking. The coating film, on which the post-lubrication is applied, may be the first coating film or the second coating film, or may be both the first coating film and the second coating film. The post-lubrication is, for example, the petrolatum wax. The petrolatum wax is, for example, paraffin, petrolatum, and the like. The petrolatum is white Vaseline, which has a function to provide mainly lubrication performance.

The post-lubrication on the second coating film is 10 mg/m$^2$ or less in amount (as a mass in solid content of the coating material). This contributes to further enhancement in the foaming performance of the coated aluminum sheet for the reasons below. Foam, which is generated in pouring a canned beer or the like into another container, is generated due to impact and turbulence that the beer or the like undergoes when the beer or the like exits its can and enters into the other container. If a can lid contains a considerable amount of the post-lubrication that has a foam disappearance effect, foam generation is discouraged when the beer or the like is poured and the excellent foaming performance decreases. If the post-lubrication is 10 mg/m$^2$ or less in amount, such problems are unlikely to occur and therefore, the foaming performance increases.

Preferably, the coated aluminum sheet does not include the post-lubrication. In particular, it is preferable that the post-lubrication is not applied on the second coating film. When the coated aluminum sheet, which does not include the post-lubrication, is used for the can lid or the like, it is possible to inhibit the post-lubrication from transferring from the coated aluminum sheet to contents in a can. When the coated aluminum sheet does not include the post-lubrication, the foaming performance is further enhanced.

(4) Configuration of Coated Aluminum Sheet

The coated aluminum sheet has a configuration shown in FIG. 1, for example. Specifically, a coated aluminum sheet 1 comprises an aluminum alloy sheet 3 that includes a first surface 3a and a second surface 3b situated opposite to the first surface 3a; a first coating film 5 that is formed on the first surface 3a of the aluminum alloy sheet 3; and a second coating film 7 that is formed on the second surface 3b of the aluminum alloy sheet 3.

2. Aluminum Can Lid

An aluminum can lid includes the above-described coated aluminum sheet. In the aluminum can lid, the first coating film 5 is an outer surface of the aluminum can lid and the second coating film 7 is an inner surface of the aluminum can lid. The aluminum can lid is excellent in the foaming performance and the molding workability.

3. Examples (1) Manufacturing of Coated Aluminum Sheet

Prepared was a basal sheet that is made of an A5182 alloy sheet (Al—Mg-based alloy) having a sheet thickness of 0.25 mm. The basal sheet corresponds to the aluminum alloy sheet. The basal sheet was applied with about 20 mg/m$^2$ of phosphate chromate. Then, the basal sheet was coated with a coating material on a surface of the basal sheet so that a coating film is formed, thereby manufacturing the coated aluminum sheet. In some cases (Examples 5 to 7), only one layer of a thin coating film is formed on the surface of the basal sheet, whereas, in other cases (Examples 1 to 4, Comparative Example 1 to 11), two layers of a thick coating film are formed on the surface of the basal sheet in manufacturing the coated aluminum sheet. The only one layer of the thin coating film includes a coating film A. The two layers of the thick coating film include a coating film B and the coating film A. The coating film B is placed closer to the basal sheet (inner side) than the coating film A is and the coating film A is layered onto a surface of the coating film B to be situated outside the coating film B.

Respective coating materials for forming the coating film A and the coating film B are made of the same composition component. The respective coating materials each include an epoxy-based resin coating material as a main component and further include the inner wax. When two or more coating materials are layered to form the coating film, the two or more coating materials may have the same composition or may have respective different compositions.

A type and a blending amount of the inner wax are as shown in Table 1. In Table 1, a unit for a numerical value of the blending amount of the inner wax is percent by mass, which is a value expressed when the entirety of the coating film is 100% by mass. A percent by mass of each wax in Table 1 means a fraction of 100 in solid content of the coating material. A coating amount of the post-lubrication and a deposited amount of the inner wax each mean a mass in solid content of the coating material per unit area.

TABLE 1

| | Blending Amount of Inner Wax | | | Post-Lubrication | Inner Wax |
|---|---|---|---|---|---|
| | Polyethylene % by mass | Carnauba % by mass | Lanolin % by mass | Coating Amount mg/m² | Deposited Amount mg/m² |
| Example 1 | 0.4 | 0.4 | 0 | 0 | 2.5 |
| Example 2 | 0.75 | 0.75 | 0 | 0 | 5 |
| Example 3 | 0.75 | 0.75 | 0.7 | 0 | 5 |
| Example 4 | 0.75 | 0.75 | 0.7 | 10 | 5 |
| Example 5 | 1.5 | 1.5 | 0 | 0 | 9 |
| Example 6 | 1.5 | 1.5 | 1.5 | 0 | 9 |
| Example 7 | 1.5 | 1.5 | 1.5 | 10 | 9 |
| Comparative Example 1 | 0 | 0 | 0 | 0 | <0.1 |
| Comparative Example 2 | 0.75 | 0 | 0 | 0 | 0 |
| Comparative Example 3 | 1.5 | 0 | 0 | 0 | 0 |
| Comparative Example 4 | 3 | 0 | 0 | 0 | 0 |
| Comparative Example 5 | 0 | 0.75 | 0 | 0 | 5.5 |
| Comparative Example 6 | 0 | 1.5 | 0 | 0 | 10 |
| Comparative Example 7 | 0 | 3 | 0 | 0 | 13 |
| Comparative Example 8 | 2.5 | 2.5 | 0 | 0 | 11 |
| Comparative Example 9 | 0 | 0 | 0 | 30 | 0 |
| Comparative Example 10 | 0.75 | 0.75 | 0 | 30 | 5 |
| Comparative Example 11 | 1.5 | 1.5 | 2.5 | 0 | 9 |

The coating film A is 4 g/m² in mass (in solid content of the coating material) per unit area. The coating film B is 12 g/m² in mass (in solid content of the coating material) per unit area. Accordingly, the thin coating film according to Examples 5 to 7, which includes the coating film A alone, is 4 g/m² in mass per unit area. The two layers of the thick coating film according to Examples 1 to 4 and Comparative Examples 1 to 11, which include the coating film A and the coating film B, are 16 g/m² in mass per unit area. After coating with the coating material, the basal sheet was kept in a furnace for 30 seconds so that the maximum temperature reached 250° C. and underwent the baking.

Regarding Comparative Examples 9 and 10, the two layers of the thick coating film, which include the coating film A and the coating film B, were further coated with the post-lubrication on the surface of the two layers of the thick coating film after the coating and the baking. A type of the post-lubrication is petrolatum. The post-lubrication was not coated in Examples and Comparative Examples other than Comparative Examples 9 and 10.

(2) Evaluation Method of Coated Aluminum Sheet

The coated aluminum sheet manufactured as above was evaluated. Evaluation methods and evaluation results are as follows. Each evaluation was conducted on one surface of the coated aluminum sheet. The evaluation results are shown in the above Tables 1 to 3. In Tables 2 and 3, "A, B" included in the column named "Subject" indicates that the thick coating film was formed, in which the coating film A and the coating film B are layered and "A" indicates that the thin coating film was formed, which includes the coating film A.

TABLE 2

| | | Foaming Capacity | | | Sliding | | | Lubrication Capacity |
|---|---|---|---|---|---|---|---|---|
| | Subject | Foam Height mm | Foam Collapsing Speed mm/min | Oil Flow | Adhesion Area in Steel Ball mm² | Strength of Coating Film W1 gf | W2 gf | Dynamic Friction Coefficient μ |
| Example 1 | A, B | 65 | 9 | 1 | 0.00 | 139 | 230 | 0.07 |
| Example 2 | A, B | 65 | 9 | 1 | 0.01 | 139 | 260 | 0.07 |
| Example 3 | A, B | 63 | 9 | 1 | 0.01 | 140 | 265 | 0.06 |
| Example 4 | A, B | 60 | 10 | 1 | 0.01 | 140 | 265 | 0.06 |
| Example 5 | A | 65 | 9 | 1 | 0.02 | 135 | 268 | 0.07 |
| Example 6 | A | 62 | 9 | 1 | 0.04 | 140 | 270 | 0.05 |
| Example 7 | A | 60 | 10 | 1 | 0.04 | 140 | 270 | 0.05 |
| Comparative Example 1 | A, B | 65 | 9 | 1 | 0.00 | 68 | 101 | 0.32 |
| Comparative Example 2 | A, B | 65 | 9 | 1 | 0.00 | 144 | 209 | 0.08 |

TABLE 2-continued

| | | Foaming Capacity | | Sliding | | Lubrication | |
| | | | | | | | Capacity |
| | | | Foam | Adhesion | | | Dynamic Friction |
| | | Foam | Collapsing | Area in | Strength of Coating Film | | |
| | | Height | Speed | Steel Ball | W1 | W2 | Coefficient |
| | Subject | mm | mm/min | Oil Flow | mm² | gf | gf | μ |
|---|---|---|---|---|---|---|---|---|
| Comparative Example 3 | A, B | 65 | 9 | 1 | 0.00 | 130 | 222 | 0.08 |
| Comparative Example 4 | A, B | 65 | 9 | 1 | 0.00 | 130 | 258 | 0.09 |
| Comparative Example 5 | A, B | 65 | 9 | 1 | 0.00 | 155 | 265 | 0.06 |
| Comparative Example 6 | A, B | 65 | 9 | 1 | 0.02 | 146 | 287 | 0.06 |
| Comparative Example 7 | A, B | 65 | 9 | 1 | 0.04 | 140 | 274 | 0.06 |
| Comparative Example 8 | A, B | 65 | 9 | 1 | 0.03 | 135 | 260 | 0.06 |
| Comparative Example 9 | A, B | 50 | 11 | 2 | 0.10 | 140 | 270 | 0.05 |
| Comparative Example 10 | A, B | 50 | 11 | 2 | 0.11 | 145 | 287 | 0.05 |
| Comparative Example 11 | A, B | 55 | 9.5 | 1 | 0.05 | 140 | 280 | 0.05 |

TABLE 3

| | | Workability Shell Dimensions | | | | ERV after Sliding | Adherence of Coating Film | Corrosion Resistance |
| | Subject | UD mm | PD mm | UCH mm | CD mm | mA | kg/5 mm | mm |
|---|---|---|---|---|---|---|---|---|
| Example 1 | A, B | 6.84 | 2.207 | 1.42 | 65.03 | 6 | 0.9 | <0.5 |
| Example 2 | A, B | 6.84 | 2.206 | 1.42 | 65.03 | 5 | 0.7 | <0.5 |
| Example 3 | A, B | 6.85 | 2.208 | 1.42 | 65.03 | 3 | 0.7 | <0.5 |
| Example 4 | A, B | 6.85 | 2.208 | 1.42 | 65.03 | 3 | 0.7 | <0.5 |
| Example 5 | A | 6.83 | 2.204 | 1.42 | 65.01 | 3.5 | 0.6 | <0.5 |
| Example 6 | A | 6.85 | 2.209 | 1.42 | 65.03 | 2 | 0.6 | <0.5 |
| Example 7 | A | 6.85 | 2.209 | 1.42 | 65.03 | 2 | 0.6 | <0.5 |
| Comparative Example 1 | A, B | 6.79 | 2.204 | 1.55 | 65.08 | 34 | 1.0 | <0.5 |
| Comparative Example 2 | A, B | 6.8 | 2.206 | 1.47 | 65.06 | 23 | 0.9 | <0.5 |
| Comparative Example 3 | A, B | 6.82 | 2.208 | 1.46 | 65.06 | 12 | 0.7 | <0.5 |
| Comparative Example 4 | A, B | 6.82 | 2.208 | 1.44 | 65.05 | 10 | 0.4 | 0.8 |
| Comparative Example 5 | A, B | 6.83 | 2.206 | 1.44 | 65.05 | 23 | 0.9 | <0.5 |
| Comparative Example 6 | A, B | 6.82 | 2.207 | 1.42 | 65.03 | 12 | 0.7 | <0.5 |
| Comparative Example 7 | A, B | 6.84 | 2.209 | 1.41 | 65.03 | 10 | 0.4 | 0.8 |
| Comparative Example 8 | A, B | 6.83 | 2.204 | 1.42 | 65.01 | 4 | 0.3 | 0.7 |
| Comparative Example 9 | A, B | 6.85 | 2.207 | 1.42 | 65.03 | 4 | 1.0 | <0.5 |
| Comparative Example 10 | A, B | 6.86 | 2.208 | 1.40 | 65.04 | 3 | 0.7 | <0.5 |
| Comparative Example 11 | A, B | 6.85 | 2.209 | 1.42 | 65.03 | 2 | 0.5 | <0.5 |

(2-1) Deposited Amount of Carnauba Wax

The deposited amount of the inner wax on the surface of the coating film of each of Examples 1 to 7 and Comparative Examples 1 to 11 were measured as follows.

First, the coated aluminum sheet was immersed into warm hexane. During the immersion, the carnauba wax deposed on the surface of the coating film was dissolved in the warm hexane. Then, the warm hexane that includes the dissolved carnauba wax was heated and concentrated. Thereafter, an amount of the carnauba wax was determined by a gas chromatograph. Conditions on the gas chromatograph are as follows.

Device: GC-2014 manufactured by Simadzu Corporation
Columns: OV-101
Conditions on temperature rise: a temperature increases from 100° C. to 350° C. at a speed of 20° C./min; and if the temperature reaches 350° C., then the temperature is maintained at 350° C. for 18 minutes.

Detector: FID
Temperature of Detector: 370° C.
Temperature at Injector Port: 370° C.
Type of Carrier Gas and Flowing Amount: $N_2$, 20 mL/min.

The above Table 1 shows, in the column named "Deposited Amount of Inner Wax", measurement results of the deposited amount of the carnauba wax.

(2-2) Foaming Performance Test

A lid was formed using the coated aluminum sheet, which is an evaluation subject. A specified beverage was poured into a beverage can body and the lid was roll-seamed onto the beverage can body to form a can body. During this, the beverage was filled in the can body. The can body was placed and stored in a refrigerator for 24 hours.

After 24 hours of storing, a pouring port arranged in the lid was opened. Then, the can body was attached to a beverage can body holding case. The beverage can body holding case rotates using a driving force of a stepping motor and can tilt the can body. The beverage can body holding case was rotated to a specified angle at a specified speed. During the rotation, the beverage exited the pouring port and was poured into a one liter glass beaker that is placed under the can body in advance. The one liter glass beaker was sufficiently cleaned and dried in advance. The beverage poured into the one liter glass beaker generated foam.

Measured was a foam height $h_1$ immediately after the beverage was poured. The higher the foam height $h_1$ is, the more the coated aluminum sheet has excellence in the foaming performance. Measurement results are shown in the above Table 2 in the column named "Foam Height".

Further measured was a foam height $h_2$ at the time when 10 minutes passed from pouring of the beverage. A difference between $h_1$ and $h_2$ were divided by 10 minutes to calculate a value. This value is a foam disappearance speed. The less the foam disappearance speed is, the more the coated aluminum sheet has excellence in the foam disappearance resistance. Measurement results are shown in the above Table 2 in the column named "Foam Disappearance Speed".

(2-3) Oil Flow Test

The lid was manufactured using the coated aluminum sheet, which is the evaluation subject, and was provided with a tab attached thereto. Pure water was poured into the beverage can body to such an extent that the pure water overflows. Confirmation was made that no dirt and/or dust is present on a water surface. If present, the dirt and/or dust are removed in a manner to softly blow air, for example. The pure water in the beverage can body was added with an appropriate amount of an India ink or a blue color ink to be colorized. Thereafter, the tab was pulled so that a drink port in the lid slightly opens to create an air vent. Then, the lid was floated on the surface of colorized water in an opening of the beverage can body. The lid remained waited for 10 minutes in a floating state on the colorized water. During this, an inner surface of the lid was in contact with the colorized water.

In response to elapse of 10 minutes, the lid was slowly removed from the beverage can body and the colorized water. Observation was made to the liquid surface. If the liquid surface includes suspended solids in the form of oil film, then an oil flow area is visually studied. The oil flow area is a rate of an area, where the suspended solids are present in the form of oil film, to the entire area of the liquid surface. The oil flow area is shown in the above Table 2 in the column named "Oil Flow Area". In Table 2, "1" indicates that the oil flow area is 10% or less and "2" indicates that the oil flow area is between 10% to 30%. The oil flow area is an index value that indicates oil flow performance.

(2-4) Wax Accumulation Performance

A Heidon tester was used to bring the coating film of the coated aluminum sheet, which is the evaluation subject, into contact with a steel ball. The steel ball applied a load and slid on the coated aluminum sheet. Then, measured was an area of the wax adhered to the steel ball (a sliding adhesion area in the steel ball) using an image analysis device. Measurement results are shown in the above Table 2 in the column named Sliding Adhesion Area in Steel Ball. The sliding adhesion area in the steel ball is an index value that indicates wax accumulation performance.

(2-5) Strength of Coating Film

The Heidon tester was used to bring the surface of the coating film of the coated aluminum sheet, which is the evaluation subject, into contact with a contact piece to scan the surface of the coating film while changing a load. The Heidon tester studied a change in an obtained friction, to thereby calculate a load W1 and a load W2. Under the load W1, the surface of the coating film started being scratched. Under the load W2, the contact piece penetrated through the coating film and reached an aluminum surface. Measurement results are shown in the above Table 2 in the columns named W1 and W2. The load W1 and the load W2 each are an index value that indicates strength of the coating film.

(2-6) Lubrication Performance

A three-ball type lubrication tester was used to measure a dynamic friction coefficient of the coating film of the coated aluminum sheet, which is the evaluation subject. Measurement results are shown in the above Table 2 in the column named Dynamic Friction Coefficient. The dynamic friction coefficient is an index value that indicates lubrication performance of the coating film.

(2-7) Workability

Figure 2:
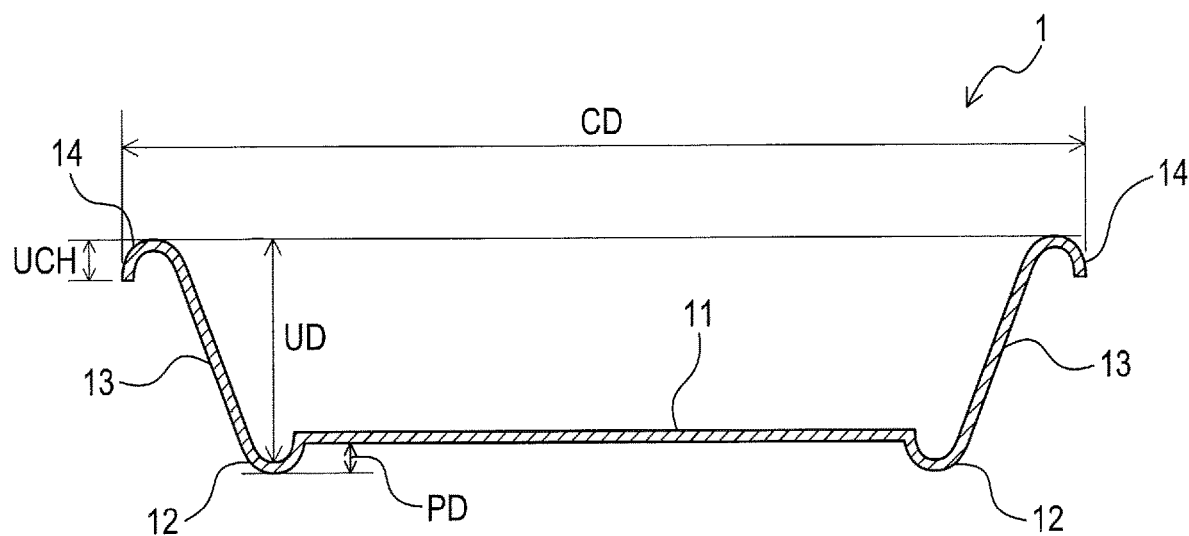
FIG. 2 is a sectional explanatory diagram of a can lid (shell lid).

The coated aluminum sheet, which is the evaluation subject, was used to undergo shell-pressing so that a shell lid is manufactured. The shell lid, which is the can lid, forms a can together with the can body. As shown in FIG. 2, a shell lid 1 includes a planar surface portion 11, an inwardly protruding portion 12 that protrudes inward of the can in a periphery of the planar surface portion 11, an outwardly protruding portion 13 that protrudes outward of the can from the inwardly protruding portion 12 and outward of the planar surface portion 11. The outwardly protruding portion 13 includes a roll-seamed portion 14 that is roll-seamed together with an upper edge of a can body 2.

Thereafter, a unit depth (UD), a panel depth (PD), an uncurled height (UCH), and a curl diameter (CD) of the shell lid were measured. The CD was an average value of measured values obtained by measuring the CD at four points using a caliper. The UD, the PD, and the UCH each are an average value of measured values obtained by measuring the UD, the PD, and the UCH, respectively, at eight points using a depth measuring machine. Measurement results are shown in the above Table 3 in the column named Shell Dimensions. The shell dimensions are index values that indicate workability. It is indicated that the larger the UD and the PD are, the greater the workability tends to be; and the smaller the UCH and the CD are, the greater the workability tends to be.

(2-8) ERV (Enamel Rater Value) after Sliding

A shell was manufactured using the coated aluminum sheet, which is the evaluation subject. The shell was placed on a SUS surface sheet and was slid carrying a weight of 1000 g at a speed of 1 m/min for a distance of 180 mm in a direction along a straight line. Thereafter, the ERV of the shell was measured. The ERV is a flowing electric current value measured by filling 1% saline solution, as electrolytic solution, into a container that has the shell lid attached to the bottom thereof and applying a voltage of approximately 6V between the solution and the can lid. Measurement results are shown in the above Table 3 in the column named ERV after Sliding. The ERV after the sliding is an index value that indicates the scratch resistance of the coating film. The smaller the value of the ERV after the sliding is, the more the coating film is sound.

(2-9) Adherence of Coating Film

The adherence of the coating film was tested through a T-peel test. A testing method is as follows. Coated aluminum sheets were adhered together to their inner surfaces using an amide resin film by hot pressing (heat and pressure joining). Then, the coated aluminum sheets were peeled from each other in respective ends to be formed into T-shape. Then, measured was a load at the time of pulling the respective peeled ends using a pulling tester. An obtained maximum resistance load is regarded as a T-peel strength and is set to be an index value of the adherence of the coating film. Measurement results are shown in the above Table 3 in the column named Adherence.

(2-10) Corrosion Resistance

Prepared was model juice solution that contains 0.5% by mass of sodium chloride and 1.0% by mass of citric acid monohydrate. The coated aluminum sheet, to which cross-cutting was applied, was immersed into the model juice solution having a temperature of 70° C. for 72 hours. After the immersion, measured was a corroded length of a coating film-peeled portion that is worsened in a vertical direction with respect to a cut direction, and the corroded length was set to be an index value of corrosion resistance. Measurement results are shown in the above Table 3 in the column named Corrosion Resistance.

(3) Evaluation Results on Coated Aluminum Sheet

Favorable results were obtained in Examples 1 to 7 in respect of all the evaluation items.

The coating film of Example 2 includes the polyethylene wax and the carnauba wax as the inner wax. Example 2 was favorable in the workability in comparison with Comparative Examples 1 to 4, in which the coating film does not include the carnauba wax and with Comparative Examples 5 to 7, in which the coating film does not include the polyethylene wax.

Example 3 was the same as Example 2 except that the coating film of Example 3 includes lanoline, whereas the coating film of Example 2 does not include lanoline. As a result of comparison between Examples 2 and 3, Example 3 showed a decreased dynamic friction coefficient of the coated sheet and was favorable in the lubrication performance of the coated sheet in comparison with Example 2.

Examples 5 and 6 are the same as Examples 2 and 3 in that Example 6, in which the coating film includes lanoline, was favorable in the lubrication performance of the coated sheet in comparison with Example 5, in which the coating film does not include lanoline.

Example 4, in which the surface of the coating film is applied with the post-lubrication, showed a slightly decreased foam height and was longer (larger) in the foam disappearance speed in comparison with Example 3, in which the post-lubrication is not applied. Example 7, in which the surface of the coating film is applied with the post-lubrication, showed a slightly decreased foam height and was longer (larger) in the foam disappearance speed in comparison with Example 6, in which the post-lubrication is not applied.

Comparative Example 1 showed a dynamic friction coefficient of 0.32, which was high. Further, Comparative Example 1 was deficient in the workability and the scratch resistance and had a higher ERV after the sliding.

Comparative Examples 2 to 7 had locally insufficient coating film strength and therefore showed a higher ERV after the sliding.

Comparative Example 5, in which the coating film does not include the polyethylene wax, had a higher ERV after the sliding and was inferior in respect of the scratch resistance in comparison with Example 1, in which the coating film includes the polyethylene wax.

Further, Comparative Examples 4 and 7 showed deficiency in the adherence of the coating film and the corrosion resistance. Comparative Example 8 was deficient in the adherence of the coating film and the corrosion resistance.

In Comparative Examples 9 and 10, the post-lubrication was coated at 30 mg/m². The foam height $h_1$ was 50 mm, the foam disappearance speed was 11 mm/min, and the oil flow area was 10 to 30%. In other words, Comparative Examples 9 and 10 were deficient in the foaming performance and the oil flow performance.

In Comparative Example 11, the coating film included 2.5% by mass of lanoline. Lanoline eluted from the coating film and therefore, the foam height $h_1$ was 55 mm.

The examples of the present disclosure have been described above; however, the present disclosure is not limited to the above-described examples and can be carried out in various forms.

(1) A function of one element in the aforementioned examples may be distributed to a plurality of elements. A function of a plurality of elements may be exhibited by one element. A part of the configuration in each of the aforementioned example may be omitted. At least a part of the configuration in each of the aforementioned example may be added to or replaced with the configuration of another example or other examples of the aforementioned examples. It should be noted that any and all modes that are encompassed in the technical ideas that are defined by the languages in the claims are examples of the present disclosure.

(2) In addition to the above-described coated aluminum sheet and the aluminum can lid, the present disclosure can be carried out in various forms, such as in the form of a can body that is formed using the coated aluminum sheet, by a method of manufacturing a coated aluminum sheet, by a method of manufacturing an aluminum can lid, and the like.

The invention claimed is:

1. A coated aluminum sheet comprising:
   an aluminum alloy sheet that includes a first surface and a second surface that is situated opposite to the first surface;
   a first coating film that is formed on the first surface of the aluminum alloy sheet; and
   a second coating film that is formed on the second surface of the aluminum alloy sheet,
   wherein the first coating film and the second coating film each have a mass of 0.1 to 20 g/m² per unit area,
   wherein the first coating film includes 0.75 to 1.5% by mass of a polyethylene wax and 0.75 to 1.5% by mass of a carnauba wax,
   wherein a content of wax other than the polyethylene wax and the carnauba wax in the first coating film is 1.5% by mass or less, wherein the second coating film includes 0.75 to 0.8% by mass of a polyethylene wax and 0.75 to 0.8% by mass of a carnauba wax, wherein a content of wax other than the polyethylene wax and the carnauba wax in the second coating film is 0.7% by mass or less, wherein post-lubrication, which includes a petrolatum wax, on the second coating film is 10 mg/m² or less in amount, and wherein either the first coating film or the second coating film or both the first coating film and the second coating film include(s), as the wax other than the polyethylene wax and the carnauba wax, one or more waxes selected from a petrolatum wax, a synthetic wax, a plant wax, and an animal wax.

2. The coated aluminum sheet according to claim 1,
wherein a deposited amount of the carnauba wax on a surface of the first coating film is 2.5 to 10 mg/m², and
wherein a deposited amount of the carnauba wax on a surface of the second coating film is 2.5 to 5 mg/m².

3. The coated aluminum sheet according to claim 1,
wherein the post-lubrication is not applied on the second coating film.

4. The coated aluminum sheet according to claim 1,
wherein the first coating film includes 0.75 to 0.8% by mass of the polyethylene wax and 0.75 to 0.8% by mass of the carnauba wax.

5. The coated aluminum sheet according to claim 1,
wherein the content of the wax other than the polyethylene wax and the carnauba wax in the first coating film is 0.7% by mass or less.

6. The coated aluminum sheet according to claim 1,
wherein either the first coating film or the second coating film or both the first coating film and the second coating film include(s) lanoline as the wax other than the polyethylene wax and the carnauba wax.

7. The coated aluminum sheet according to claim 1,
wherein either the first coating film or the second coating film or both the first coating film and the second coating film is/are formed with an inner wax and an organic resin coating material, and
wherein the inner wax includes the polyethylene wax and the carnauba wax and optionally includes the wax other than the polyethylene wax and the carnauba wax.

8. The coated aluminum sheet according to claim 1,
wherein the aluminum alloy sheet includes a chemical conversion film as an undercoat of either the first coating film or the second coating film, respectively, in either the first surface or the second surface of the aluminum alloy sheet, or chemical conversion films as respective undercoats of both the first coating film and the second coating film, respectively, in both the first surface and the second surface of the aluminum alloy sheet.

9. An aluminum can lid that includes the coated aluminum sheet according to claim 1,
wherein the first coating film is situated in an outer surface of the aluminum can lid and the second coating film is situated in an inner surface of the aluminum can lid.

\* \* \* \* \*